Aug. 29, 1939.                W. H. HINSCH                 2,171,240
                              BLOW-OFF VALVE
                       Original Filed July 20, 1936
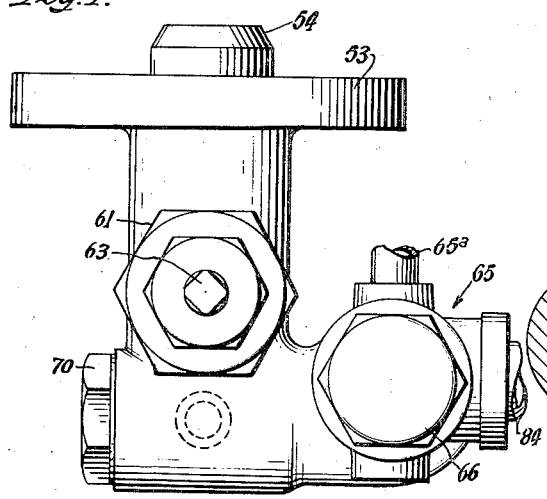
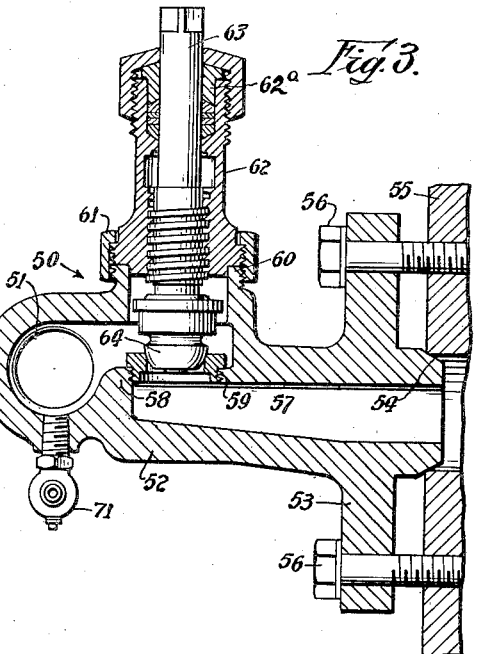
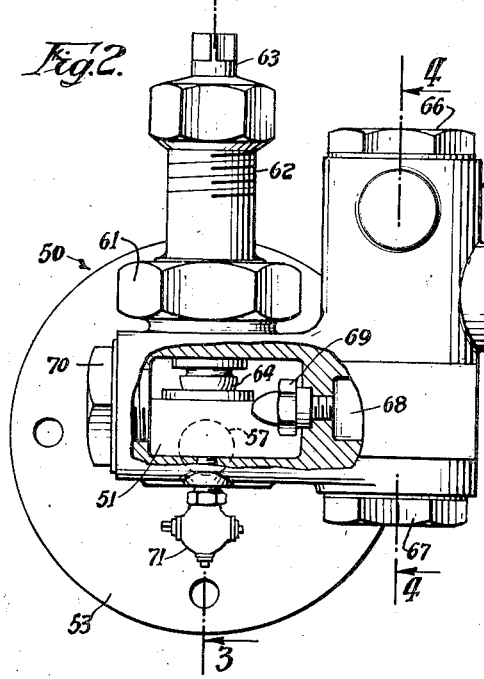
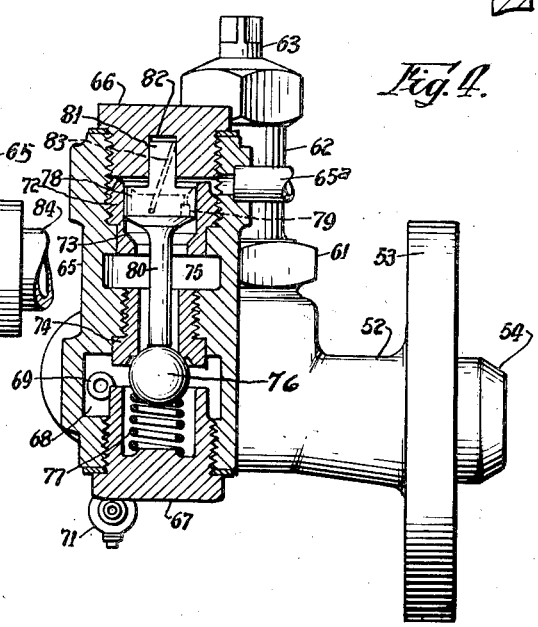
Inventor:
Walter H. Hinsch,
By: Arthur W. Nelson
                    Attorney.
Witness:
E. Camporini Patented Aug. 29, 1939

2,171,240

UNITED STATES PATENT OFFICE 2,171,240

BLOW-OFF VALVE

Walter H. Hinsch, Chicago, Ill., assignor to Dearborn Chemical Company, Chicago, Ill., a corporation of Illinois Original application July 20, 1936, Serial No. 91,510, now Patent No. 2,146,144, dated February 7, 1939. Divided and this application April 8, 1937, Serial No. 135,670

7 Claims. (Cl. 277—63)

This invention relates to improvements in blow-off valves and it consists in the matters hereinafter set forth and more particularly pointed out in the appended claims.

The present application is a divisional application as the subject matter herein was first presented in my copending application entitled "Blow-off apparatus for locomotive boilers", filed July 20, 1936, and bearing Serial No. 91,510, and now Patent No. 2,146,144, granted Feb. 7, 1939.

One of the objects of the present invention is to provide a valve for use in a boiler blow off apparatus and which valve is positive in its operation, permits changing the volume or flow control orifice plug without disassembly of the valve or without boiler shut down, eliminates jet discharge or impingement of boiler water upon the valve member and establishes a centrifugal action in the chamber or cavity in which said member is located so that said chamber or cavity is scoured and left free of sludge.

Other objects of the invention, as well as the several advantages thereof will more fully appear as the specification proceeds.

In the drawing:

Fig. 1 is a top plan view of the improved blow off valve.

Fig. 2 is a view in side elevation of the blow off valve, with parts broken away better to illustrate the internal parts thereof.

Fig. 3 is a vertical sectional view through a part of the improved valve as taken on the line 3—3 of Fig. 2.

Fig. 4 is a vertical sectional view through another part of the valve as taken on the line 4—4 of Fig. 2.

Referring now in detail to that embodiment of the invention illustrated in the drawing, the improved valve comprises a one piece casing or hollow body 50 in which is formed a chamber 51, the body having a hollow lateral extension 52 that terminates in a bolting flange 53 carrying a joint ring 54. This ring is adapted to engage in a suitable hole in the outside sheet 55 of a side water leg of a locomotive boiler and bolts 56 pass through the flange into said sheet to secure the casing in pressure tight relation with respect to the boiler as a whole.

The hollow extension 52 defines a boiler water inlet passage 57 and the inner end of said passage is separated from a part of the chamber 51 by a partition 58. Engaged in said partition is a valve seat ring 59. Axially in line with said ring, the casing is provided with an upright tubular extension 60 upon which is threaded a union nut 61 to secure a stuffing box sleeve 62 in place upon said extension. A valve stem 63 has a threaded engagement in said sleeve and carries a head 64 at its bottom end for engagement on the seat as provided by the valve ring 59. The top end of the sleeve 62 carries a stuffing box arrangement 62a through which the stem 63 extends, the extremity of said stem outside the arrangement mentioned, being squared to receive a wrench or other operating member. When the valve head is engaged on the ring seat, communication between the passage 57 and chamber 51 is shut off so that no boiler water can pass into said chamber from the boiler. When said valve head is off said seat, the said passage and the said chamber are brought into communication with each other so that boiler water may pass into said chamber.

The body of the valve casing is further formed with an upright tubular boss 65 which is closed at its top and bottom ends by screw caps or plugs 66 and 67 respectively. The vertical axis of said boss is offset inwardly from the horizontal axis of the chamber 51 toward the bolting flange 53. In the bottom end of the boss 65 is a chamber 68 and in that wall of the casing body separating the chamber 68 from the chamber 51, an orifice nipple 69 is threaded. This nipple which controls the amount or volume of boiler water passing through the blow-off valve when open, has a projectile type of nose arranged in the chamber 51 to prevent the closure of the orifice by accumulation of foreign particles such as boiler scale. That end of the chamber 51 opposite the orifice nipple is closed by a screw cap or plug 70 of such size as to permit access to the nipple for removal in changing or replacing the same. In the bottom of that part of the casing body defining the chamber 51 is a drain cock 71, by means of which a more representative sample of boiler water may be obtained with greater facility. Said cock may also be used for draining the chamber 51 when it is so desired. The nipple 69 is so disposed that its orifice opens tangentially into the chamber 68 in the bottom of the boss 65.

Threaded into the boss 65, is a cylinder sleeve 72 with a tapered seat 73, and a valve seat ring 74 spaced apart by a chamber 75. The ring 74 defines a downwardly facing seat against which a spherical valve member 76 is normally held by a spring 77 carried by the plug or cap 67. It is to be noted from Fig. 4 that the orifice nozzle 69 discharges its jet tangentially into the chamber 68 so as to scour the walls thereof to keep them free of accumulation of scale or the like. With the tangential arrangement mentioned, another advantage is present in that the jet from the orifice nozzle does not discharge upon the valve member 76 or its seat to pit or otherwise damage them.

78 indicates a piston which operates in the sleeve 72. The bottom end of said piston is bevelled to have a tight seating engagement on the seat 73 when the piston has been moved downwardly as will later appear. The line 65ª which is in a valve controlled communication with the steam space of the associated boiler, opens laterally into the top end of the boss 65 above the piston 78 therein. In said piston is a small port 79 for releasing the steam from that part of the chamber in the sleeve 72 above said piston and the line 65ª feeding said chamber when said line is closed off.

The piston is provided with a bottom end pin-like stem 80 for engagement with the ball valve member 76. When the piston is moved downwardly said valve member is pushed off its seat against the action of the spring 77 to open communication between the chambers 68 and 75, the latter chamber being the one from which boiler water is discharged as will soon appear. The piston is further provided with a top end guide extension 81 which slides in a guide recess 82 provided therefor in the top cap or plug 66. In said extension 81 is a small groove 83 through which steam may bleed to prevent the formation of a vacuous condition in said recess affecting the operation of the piston.

Threaded into the boss 65 in communication with the chamber 75 is one end of the discharge pipe 84 for the blow-off valve as a whole. When the line 65ª is in open communication with the steam space of said associated boiler, steam under boiler pressure enters into that space in the hollow boss 65 between the cylinder sleeve 72 and cap or plug 66 to build up a pressure on the top side of the piston 78. This forces the piston downwardly until its bevelled bottom end engages the seat 73 in the sleeve 72. Due to the provision of the small groove 83 in the extension 81 of the piston, steam enters into the recess 82 above said extension and this prevents the formation of any vacuous condition in said recess to exert a holding back action on said extension and its piston.

In the downward movement of the piston, its stem 80 forces the ball valve 76 downwardly off its seat in the ring 74. The blow-off valve is now opened so that water in the side water leg of the boiler, to which the valve is attached, enters the passage 57, under boiler steam pressure. From said passage, said water passes through the valve seat ring 59 and into the chamber 51 and then passes through the orifice in the nozzle 69 for discharge as a continuous jet, tangentially into the chamber 68 in the bottom end of the valve boss 65. Due to the entrance of the jet tangentially into said chamber, it cannot impinge upon the ball valve, but acts to scour the walls of said chamber clean.

As the valve member 76 is being held off its seat by the piston stem 80, the water passes through the valve ring 74 into the chamber 75. Due to the differential in areas of the ends of the piston 78, the pressure of the water in said chamber is ineffective to lift the piston, so that the water passes out through said chamber 75 into the pipe 84 for discharge.

The continuous passage of boiler water through the nozzle orifice mentioned, produces a wear thereon which enlarges the diameter of said orifice. This, of course, increases the volume of discharge to one above the desired volume. To remedy this condition requires the replacement of the worn nozzle by a new one.

With the associated boiler under steam, the valve stem 63 is manipulated to cause its head 64 to engage on the seat of the ring 59 and this closes off the blow-off valve. The plug 70 at the end of the chamber 51 is then removed to give access to the nozzle 69. By means of a suitable socket wrench the worn orifice nozzle 69 is unscrewed and removed and a new one with a proper size orifice is substituted. At this time, the chamber 51 may be cleaned out to rid it of any scale and like accumulation and the plug 70 is then replaced. Thus, it is apparent that the nozzle may be removed and a new one substituted therefor without a shut-down of the boiler. The valve may be made ready for future operation merely by opening the shut-off valve 63—64 to provide communication between the passage 57 and chamber 51.

It is apparent that with the construction described, parts of the blow-off valve may be readily removed and replaced without requiring boiler shut-down and without removing the blow-off valve or injuring the same.

While in describing the invention, I have referred in detail to the form, arrangement and construction of the various parts thereof, the same is to be considered only in the illustrative sense so that I do not wish to be limited thereto except as may be specifically set forth in the appended claims.

I claim as my invention:

1. A blow-off valve comprising a hollow body formed with a steam line inlet, a boiler water inlet and a boiler water outlet, a valve for controlling the passage of water through the body to the outlet, means operable by steam entering the body from the steam line inlet for opening said valve, and means for providing a jet orifice in the body between the boiler water inlet and said valve for controlling the volume of water passing through the valve, the orifice being so arranged to discharge tangentially with respect to the axis of the valve so that its jet does not impinge against the valve.

2. A blow-off valve comprising a hollow body formed with a steam line inlet, a boiler water inlet and a boiler water outlet, the body being further formed with a chamber between said boiler water inlet and said boiler water outlet, a valve in said chamber for controlling the passage of water through the body to the outlet, means operable by the steam entering the body from the steam line inlet for opening the valve, and means providing a jet orifice in the body between the boiler water inlet and said chamber for controlling the volume of water passing through the valve, the orifice being arranged to discharge tangentially into said chamber so as to set up a centrifugal action therein.

3. A blow-off valve comprising a hollow body formed with a steam line inlet, a boiler water inlet and a boiler water outlet, there being two chambers in said body, one of which receives boiler water from said inlet, a self-closing valve in the other chamber for controlling the passage of water through the body to the boiler water outlet, means operable by steam entering the body from the steam line inlet for opening said valve, means removably engaged in a part of said body providing a jet orifice between said two chambers that discharges tangentially into said other chamber so as to establish a centrifugal action therein.

4. A blow-off valve comprising a hollow body formed with a steam line inlet, a boiler water inlet and a boiler water outlet, there being two chambers in said body, one of which receives boiler water from said inlet, a self-closing valve in the other chamber for controlling the passage of water through the body to the boiler water outlet, means operable by steam entering the body from the steam line inlet for opening said valve, a nozzle removably engaged in a part of the body between said two chambers and adapted to discharge into said other chamber, means providing access to the first mentioned one of said chambers for the removal of said nozzle, and means for closing off said boiler water inlet preparatory to so removing said nozzle.

5. A blow-off valve comprising a hollow body formed with a steam line inlet, a boiler water inlet and a boiler water outlet, there being two chambers in said body, one of which receives boiler water from said inlet, a self-closing valve in the other chamber for controlling the passage of water through the body to the boiler water outlet, means operable by steam entering the body from the steam line inlet for opening said valve, and means in a part of said body providing a jet orifice between said two chambers and discharging tangentially into that chamber with the valve therein and out of line with said valve so that the jet does not impinge thereon.

6. A blow-off valve comprising a hollow valve body formed with a steam line inlet, a boiler water inlet, a boiler water outlet, a chamber in communication with said boiler water inlet and a second chamber in communication with said boiler water outlet, an apertured plug removably engaged in a part of the body and providing a communicating orifice between said two chambers, a self-closing valve mechanism in the second chamber for controlling the passage of boiler water from said second chamber to said boiler water outlet, means in the steam line inlet responsive to steam pressure for opening the self-closing valve mechanism, means for controlling the passage of boiler water from the inlet therefor into the first mentioned chamber, and means removably engaged in a part of the body, substantially in line with said plug permitting access into the first mentioned chamber for the removal and the replacement of said plug.

7. A blow-off valve comprising a hollow valve body, formed with a steam line inlet, a boiler water inlet, a boiler water outlet, a chamber in communication with the boiler water inlet, and a second chamber in communication with the boiler water outlet, a wall separating said chambers and having an opening therein, means removably engaged in said opening providing an orifice between said chambers, a self-closing valve mechanism in said second chamber for controlling the passage of boiler water from said second chamber to the boiler water outlet, means in said steam inlet and responsive to steam pressure for opening said self-closing valve mechanism, means for controlling the passage of boiler water from the inlet therefor into the first mentioned chamber, and a plug removably secured in a part of the casing opposed to the orifice providing means permitting access into said first mentioned chamber.

WALTER H. HINSCH.